(12) United States Patent
Nicholas et al.

(10) Patent No.: US 10,977,613 B2
(45) Date of Patent: Apr. 13, 2021

(54) METHOD AND SYSTEM FOR PROVIDING COOPERATIVE PURCHASING OVER SOCIAL NETWORKS

(75) Inventors: Frank C. Nicholas, Glenview, IL (US); Ian B. Carswell, Chicago, IL (US)

(73) Assignee: DIZPERSION TECHNOLOGIES, INC., Evanston, IL (US)

(*) Notice: Subject to any disclaimer, the term of this patent is extended or adjusted under 35 U.S.C. 154(b) by 1776 days.

(21) Appl. No.: 11/254,581

(22) Filed: Oct. 20, 2005

(65) Prior Publication Data

US 2006/0085259 A1 Apr. 20, 2006

Related U.S. Application Data

(60) Provisional application No. 60/620,571, filed on Oct. 20, 2004.

(51) Int. Cl.
*G06Q 30/02* (2012.01)
*G06Q 10/10* (2012.01)
*G06Q 30/06* (2012.01)

(52) U.S. Cl.
CPC ......... *G06Q 10/10* (2013.01); *G06Q 30/0207* (2013.01); *G06Q 30/0603* (2013.01)

(58) Field of Classification Search
CPC ...... G06Q 30/02; G06Q 10/10; G06Q 30/207; G06Q 30/0603
See application file for complete search history.

(56) References Cited

U.S. PATENT DOCUMENTS

| | | | |
|---|---|---|---|
| 5,724,521 A | 3/1998 | Dedrick | |
| 5,848,396 A | 12/1998 | Gerace | |
| 6,078,897 A | 6/2000 | Rubin et al. | |
| 6,101,484 A | 8/2000 | Halbert et al. | |
| 6,144,944 A | 11/2000 | Kurtzman, II et al. | |
| 6,260,024 B1 | 7/2001 | Shkedy | |
| 6,269,343 B1* | 7/2001 | Pallakoff | 705/26.2 |

(Continued)

OTHER PUBLICATIONS

Anand, Krishnan S.; Aron, Ravi; Group Buying on the Web: A Comparison of Price-Discovery Mechanisms; Management Science; vol. 49, No. 11, Nov. 2003; pp. 1546-1562.

*Primary Examiner* — Thuy N Nguyen
(74) *Attorney, Agent, or Firm* — Cardinal Law Group, LLC

(57) ABSTRACT

The invention provides methods for facilitating a cooperative purchasing service. One method includes: providing a conditional purchase opportunity including a purchase threshold, providing information associated with the a conditional purchase opportunity to at least one display node, receiving a contingent purchase input from a user having a social network user profile, and associating the conditional purchase opportunity with the user profile. A further method includes: requesting cooperative purchase feed formatted content associated with a social network user account, receiving cooperative purchase feed formatted content including a cooperative purchase offer in response to the request, and providing the a cooperative purchase offer including a social network identifier, at a social network user interface. A further method includes: providing a feed formatted cooperative purchasing opportunity, receiving a request to send the cooperative purchasing opportunity to a associate, and Indexing the cooperative purchasing opportunity to an associate feed based on the request.

31 Claims, 12 Drawing Sheets

(56) References Cited

U.S. PATENT DOCUMENTS

| | | |
|---|---|---|
| 6,584,451 B1 | 6/2003 | Shoham et al. |
| 6,604,089 B1 | 8/2003 | Van Horn et al. |
| 6,631,356 B1 | 10/2003 | Van Horn et al. |
| 6,704,713 B1 | 3/2004 | Brett |
| 6,876,983 B1 | 4/2005 | Goddard |
| 6,934,690 B1 | 8/2005 | Van Horn et al. |
| 6,985,879 B2 | 1/2006 | Walker et al. |
| 7,080,029 B1 | 7/2006 | Fallside et al. |
| 7,107,230 B1 | 9/2006 | Halbert et al. |
| 7,124,099 B2 | 10/2006 | Mesaros |
| 7,124,107 B1 | 10/2006 | Pishevar et al. |
| 7,136,830 B1 | 11/2006 | Kuelbs et al. |
| 7,136,906 B2 | 11/2006 | Giacalone, Jr. |
| 7,146,330 B1 | 12/2006 | Alon et al. |
| 7,181,419 B1 | 2/2007 | Mesaros |
| 7,194,427 B1 | 3/2007 | Van Horn et al. |
| 7,263,498 B1 | 8/2007 | Van Horn et al. |
| 7,363,246 B1 | 4/2008 | Van Horn et al. |
| 7,364,086 B2 | 4/2008 | Mesaros |
| 7,403,906 B2 | 7/2008 | Coleman |
| 7,412,408 B1 | 8/2008 | Palazzo |
| 7,480,627 B1 | 1/2009 | Van Horn et al. |
| 7,512,540 B2 | 3/2009 | Gluck et al. |
| 7,593,871 B1 * | 9/2009 | Mesaros ................ G06Q 30/02 705/26.2 |
| 7,672,897 B2 | 3/2010 | Chung et al. |
| 8,020,106 B2 * | 9/2011 | Diab et al. .................... 715/760 |
| 8,302,164 B2 * | 10/2012 | Lunt ................... 726/4 |
| 2001/0047311 A1 * | 11/2001 | Singh ................... G06Q 30/06 705/26.1 |
| 2001/0049625 A1 | 12/2001 | Mowry |
| 2001/0049648 A1 | 12/2001 | Naylor et al. |
| 2002/0010584 A1 | 1/2002 | Schultz et al. |
| 2002/0161838 A1 * | 10/2002 | Pickover ................ G06Q 30/02 709/204 |
| 2002/0184128 A1 | 12/2002 | Holtsinger |
| 2003/0050799 A1 * | 3/2003 | Jay ...................... G06F 19/3456 705/2 |
| 2003/0204467 A1 * | 10/2003 | Kartha ................... G06Q 30/08 705/37 |
| 2003/0236711 A1 * | 12/2003 | Deguchi ................ G06Q 30/02 705/26.1 |
| 2004/0148275 A1 * | 7/2004 | Achlioptas ........................ 707/3 |
| 2004/0210514 A1 | 10/2004 | Kemp, II et al. |
| 2004/0215793 A1 * | 10/2004 | Ryan et al. ................... 709/229 |
| 2004/0220861 A1 * | 11/2004 | Morciniec .............. G06Q 30/06 705/14.35 |
| 2004/0243478 A1 * | 12/2004 | Walker et al. .................. 705/26 |
| 2005/0049981 A1 * | 3/2005 | Mixon ............... G06Q 30/0283 705/400 |
| 2005/0125333 A1 | 6/2005 | Giannetti |
| 2005/0154639 A1 * | 7/2005 | Zetmeir ........................ 705/14 |
| 2005/0216300 A1 * | 9/2005 | Appelman et al. ................. 705/1 |
| 2005/0267766 A1 * | 12/2005 | Galbreath et al. ................. 705/1 |
| 2007/0226125 A1 | 9/2007 | Temte et al. |
| 2008/0154731 A1 | 6/2008 | Mesaros |

* cited by examiner

```
<?xml version="1.0" encoding="utf-8"?>
<rss version="2.0">
  <channel>
    <title>Evanston Events - Sponsored by the Evanston Chamber</title>
    <link>http://evchamber.publishersplus.com/</link>
    <description>Evanston Events</description>
    <lastBuildDate>Wed, 21 Jul 1004 14:04:03 GMT</lastBuildDate>
    <item>
      <title>July 14th, Executive Women's Forum</title>
      <link>http://evchamber.publishersplus.com/rss/chamber2.asp</link>
      <description>8:00-9:15am, Lower Level Conference Room.  Held at One Rotary Center</description>
    </item>
    <item>
      <title>Weekend Event - Evanston Ethnic Art Festival</title>
      <link>http://evchamber.publishersplus.com/rss/ethnicarts.asp</link>
      <description>July 17th and 18th from 8am-8pm.   Held at Dawes Park on Sheridan Road and Chuch Street</description>
    </item>
    <item>
      <title>July 14th, Home-Based Business Network</title>
      <link>http://evchamber.publishersplus.com/rss/chamber.asp</link>
      <description>John Martin of Total Selling Solutions presents "Break the Rules and Close More Sales" Are you finding your prospects are turning you into an "unpaid </description>
    </item>
    <item>
      <title>Whole Foods Wednesday Lunch Special</title>
      <link>http://evchamber.publishersplus.com/rss/wholefoods.asp</link>
      <description>Whole Foods Wednesday Lunch Special $5 for a fresh baked Whole Foods pizza. Call ahead and it will be ready when you get here: 847.733.1800 </description>
    </item>
  </channel>
</rss>
```

METHOD AND SYSTEM FOR PROVIDING COOPERATIVE PURCHASING OVER SOCIAL NETWORKS

RELATED APPLICATION DATA

This application also claims the benefit of U.S. Provisional Patent Application 60/620,571 filed Oct. 20, 2004 entitled METHOD AND SYSTEM FOR PROVIDING AND TRACKING STANDARD AND ENHANCED FEED FORMATTED CONTENT. The entirety of this application is hereby incorporated by reference.

FIELD OF THE INVENTION

The present invention generally relates to feed formatted content. More specifically, the present invention relates to publishing, aggregating, and tracking feed formatted content.

BACKGROUND OF THE INVENTION

The networked world, particularly the Internet and World Wide Web (WWW), has provided numerous communication formats and commerce opportunities. Two of the most ubiquitous communication formats include email and HTML web pages. Over the past several years, there has been an increased adoption and development of feed formatted content as a method of communication. Commerce formats have included direct business to consumer set price purchasing, consumer to consumer set price purchasing, as well as auction and bulk pricing.

FIG. 1 shows representative feed formatted content 100. Feed formatted content is structured data, such as for example Electronic Data Interchange (EDI), Extensible Markup Language (XML), or a subset of a general format such as RSS (Rich Site Summary or Really Simple Syndication), a hybrid or extension of some such standard, or the like. Feed formatted content 100 may be accessed through a feed, stored in a local file, or the like. A feed is the data returned when a request for feed formatted content is made. Feed formatted content may include a feed header 101. In one embodiment, feed header 101 includes a header labeling feed formatted content 100 as XML data, and further provides two element wrappers: rss and channel. Feed formatted content 100 often represents multiple items, as is that displayed in FIG. 1. Each feed item 106 may represent one or more news headlines, events, search results, items for sale or any other data. Feed item 106 may contain any number of elements. For example, it may include a title element 107, link element 108, and a description element 109. The term feed formatted content may describe an entire feed, a portion of a feed, a feed item, or a portion of a feed item.

A category of WWW site, commonly referred to as social networking sites, have been developed and grown in popularity in recent years. Site users establish accounts and then create relationships with other user accounts, connecting the users in a social network. While these have drawn large numbers of users, the introduction of commerce on these sites that take advantage of their capabilities has been limited.

It would be useful to provide a method for establishing commerce that may be provided on social network sites.

SUMMARY OF THE INVENTION

One aspect of the invention provides a method for facilitating cooperative purchasing of a product or service. The method includes: providing at least one conditional purchase opportunity including at least one purchase threshold, providing information associated with the at least one conditional purchase opportunity to at least one display node, receiving a contingent purchase input from at least one user having a user profile on a social network, and associating the conditional purchase opportunity with the user profile.

Another aspect of the invention provides a method for facilitating cooperative purchasing of a product or service. The method includes: requesting cooperative purchase feed formatted content associated with at least one social network user account, receiving cooperative purchase feed formatted content including at least one cooperative purchase offer in response to the request, and providing the at least one cooperative purchase offer including a social network identifier, at a social network user interface.

A further aspect of the invention includes a method for operating a cooperative purchasing service. The method includes: providing at least one feed formatted cooperative purchasing opportunity to a user, receiving a request to send the cooperative purchasing opportunity to at least one associate from the user, and indexing the cooperative purchasing opportunity to an associate feed based on the request.

The foregoing aspects and other forms, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 1 illustrates one embodiment of feed formatted content, as known in the art;

DETAILED DESCRIPTION OF A PRESENTLY PREFERRED EMBODIMENT

Figure 2:
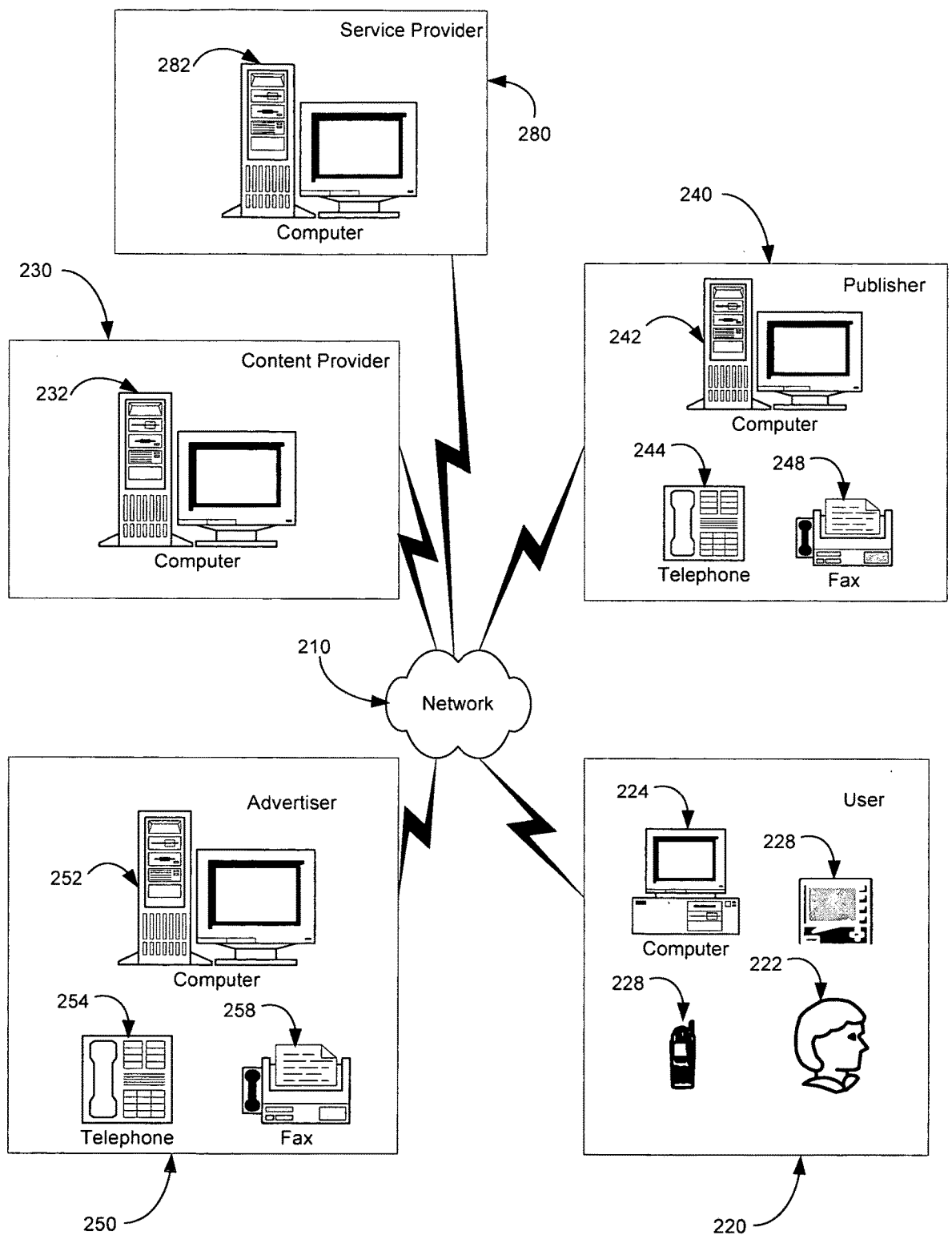
FIG. 2 illustrates a schematic diagram of one embodiment of a telecommunication system of the present invention.

Referring to FIG. 2, a telecommunication system 200 of the present invention is shown. Telecommunication system 200 comprises a network 210 which provides the communications links between the various nodes of telecommunication system 200. Links through network 210 may include permanent connections (e.g., wire or fiber optic cables), temporary connections made through telephone, wireless or satellite communications, or various nodes of telecommunication system 200 may actually be hosted on the same physical hardware platform removing the necessity of a network link altogether. Network 210 may be in the form of public or private connections available over the Internet, an extranet, an intranet, a hard-wired local area network (LAN), a hard-wired wide area network (WAN), a wireless LAN, a wireless WAN, cellular network, satellite network, and/or other forms as would occur to those having ordinary skill in the art.

A user node 220 of telecommunication system 200 operates to facilitate communications of requested information in audio form and/or visual form between a user 222 of user node 220 and one of the other nodes of telecommunication system 200. Devices, apparatuses and systems, such as for example, a cell phone 226, a personal digital assistant 228, and a personal computer 224 as illustrated, or any other user communication devices may be utilized within user node 220 to establish such communications. Other suitable devices, apparatuses and systems not illustrated include networked household appliances (e.g., televisions, refrigerators, etc.), digital or satellite radio systems, and others as would occur to those having ordinary skill in the art.

A content provider node 230 includes one or more servers 232 for communicating with the other nodes of telecommunication system 200. The requested information, pushed information, and generally provided content can be in a variety of forms, such as, for example, a static or dynamic web page (HTML or XML), a radio or video broadcast or narrowcast, wireless application protocol (WAP) content, a short messaging service (SMS) message, or other forms of network information as known in the art. All content may be provided as the entirety of requested or provided content, or as a portion. For example, content provider node 230 may provide an entire web or WAP page or only a segment of a page. Accordingly, content server 232 can include suitable hardware platforms and software modules to operate as a web site server, a radio broadcast server, etc.

Referring again to FIG. 2, publishing node 240 includes one or more servers 242 for communicating with the other nodes of telecommunication system 200. Publishing node 240 may include apparatus and communications devices such as telephone 244, or fax machine 246. In one embodiment, publishing node 240 provides some portion or all of the content for content provider 230. Publishing node 240 may also publish content or advertisements for advertiser node 250. Publishing node 240 may include interfaces for uploading or inputting by some means content that is to be published via network 210.

Advertiser node 250 represents advertisers that may be any of an end advertiser of a product or service, a marketer, a publicist, a politician, any other similar party, or any party acting as an agent of the advertiser such as a media company, public relations company, advertising agency, or traditional publication. Advertiser node 250 may include apparatus and communications devices such as computer 252, telephone 254, or fax machine 256.

Service provider node 260 represents third party service providers, whose services may be incorporated into the present telecommunications system 200. For example, Mapquest or Google Maps may provide mapping functionality and services. Evite may provide event invitation and response management services. Quova may provide IP-to-geography translation services. Gracenote may supply its CDDB product and services. Friendster, MySpace, or the like may provide social network services. Paypal or Verisign may provide payment services. These service providers are only exemplary, and within each service category other service providers may be available, or another node of the system may provide like service. Service providers may also perform advertising or publishing functions. Service providers may operate as independent nodes of telecommunications system 200, or may provide copies of their code, databases, systems and the like for local installation on another node of telecommunications system 200. Service may be provided in the form of data feeds, application program interface (API), web services, or any other form of communication available in telecommunications system 200 as would occur to one skilled in the art.

While the nodes of FIG. 2 are illustrated and described as solely communicating using network 210, this is only to be considered a best mode, and not limiting. Various nodes, where possible, may communicate using other forms of communication including phone, fax, in-person meetings, mail, and other forms known in the art. In addition, each node may consist of more or fewer communications devices, personnel, and apparatus than are illustrated. Further, while the nodes, and further their component make-up (e.g. servers, databases), are described as operating independently and on separate platforms, it should be well understood by one skilled in the art that various functions of the node or functions of the multiple nodes may be performed on the same physical hardware, or spread in different configurations, arrangements and architectures among the various nodes.

User node 220, content provider node 230, publishing node 240, advertising node 250, and service provider node 260 may each provide or receive feed formatted content. Examples herein will typically focus on XML, and specifically RSS, but it should be understood that other feed formatted content may employ like solutions. The term marker shall typically refer to an element, attribute, or group of elements and attributes within feed formatted content, and the terms marker, element, and attribute shall generally be understood to mean formatted information within feed formatted content.

For example, feed formatted content may include a payment marker. A payment marker may include reference to a site, seller, product, user account, payment gateway, or any other information that may facilitate a payment.

One or more of user node 220, content provider node 230, publishing node 240, advertising node 250, and service provider node 260 may include a social network database. A social network database is used to maintain relationships in the social network between users of system 200. In one embodiment, the database requires a request to establish a relationship from a first user to a second user, and a confirmation of the relationship from the second user to the first user. A user with whom a second user has a relationship may be said to be an associate of that user. A social network database may also include group relationships. A user may request membership in a group, and a group member or administrator may confirm the relationship. A group may request participation by a user, and the user may confirm the relationship with the group.

Figure 3:
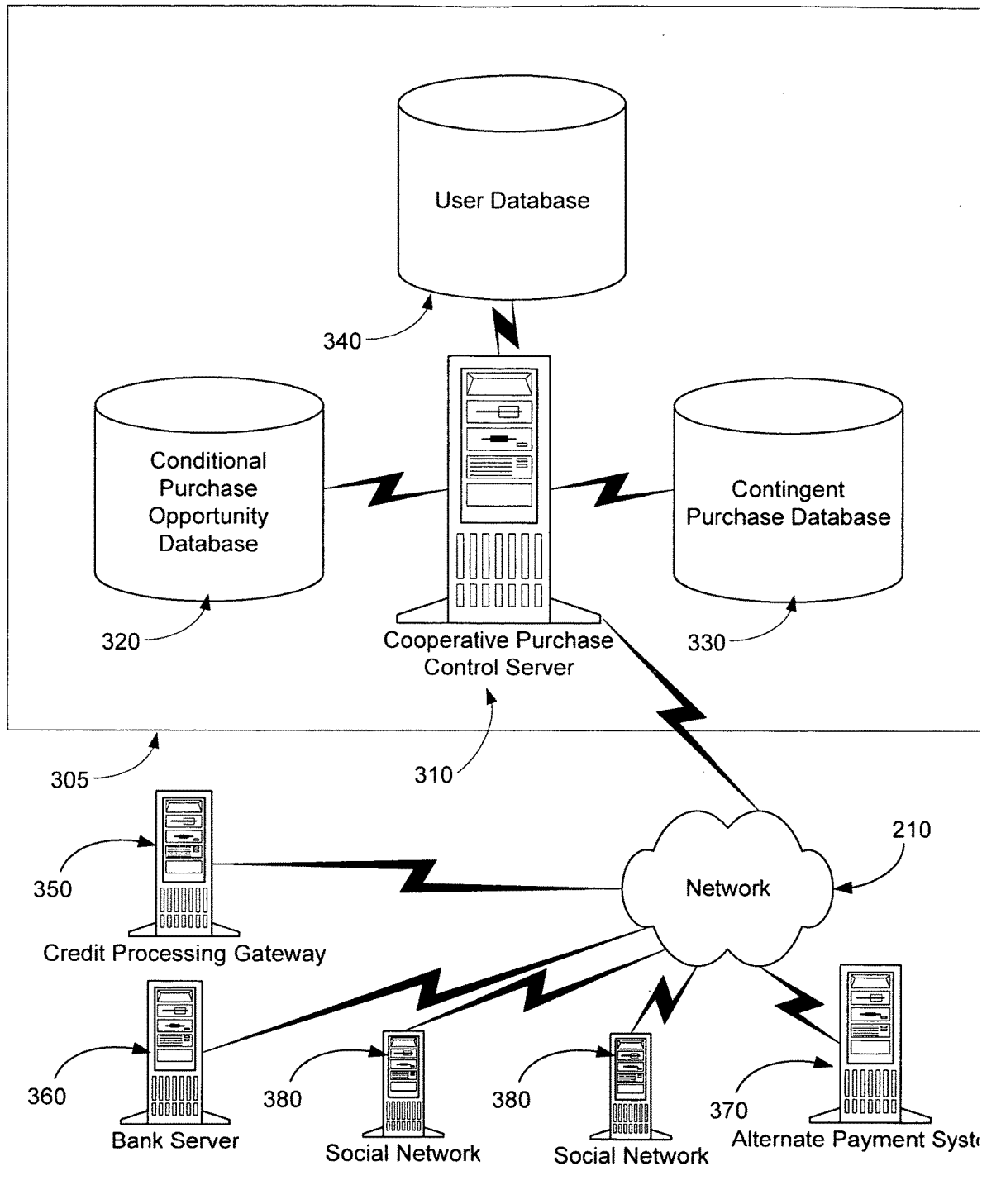
FIG. 3 illustrates a schematic diagram of one embodiment of a system for cooperative purchasing.

FIG. 3 illustrates a schematic diagram of a system for cooperative purchasing 300. A cooperative purchase node 305 may include the following: a cooperative purchase control server 310 serves to facilitate cooperative purchasing, and information regarding the cooperative purchase system may be stored in conditional purchase opportunity database 320, contingent purchase database 330, and user database 340. Cooperative purchase control server 310 may be connected to network 210. Cooperative purchase control server 310 may be held at user node 220, content provider node 230, publishing node 240, advertising node 250, service provider node 260 or spread over more than one of these nodes. Through network 210, cooperative purchase control server may communicate with credit processing gateway 350, bank server 360, alternate payment system 370, and social networks 380 all of which are examples of service provider nodes 280.

Figure 4:
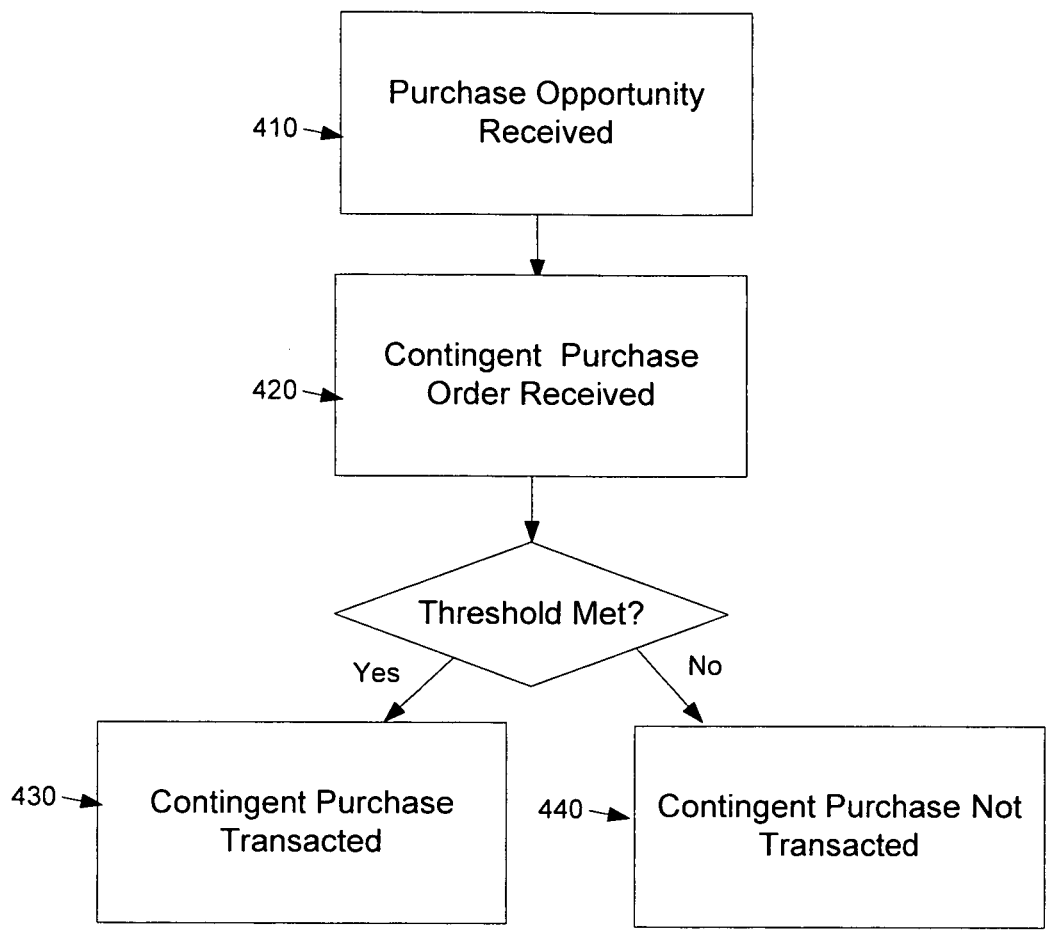
FIG. 4 illustrates a flowchart representative of one embodiment of a process for cooperative purchasing

The methods and processes described herein can be carried out using software and application code running on the platforms listed herein, and the like. FIG. 4 illustrates a flowchart representative of one embodiment of a process for cooperative purchasing. First, a purchase opportunity is received (BLOCK 410) at cooperative purchase control server 310. A contingent purchase input or order is received (BLOCK 420). Cooperative purchase control server 310 makes the determination whether a purchase threshold has been met. When the purchase threshold is met, the contingent purchase is transacted (BLOCK 430). When the purchase threshold is not met, the contingent purchase is not transacted (BLOCK 440).

In one embodiment, a cooperative purchasing system may be employed to facilitate bulk discount purchasing. For example, a car manufacturer may provide a discount to a dealership if the dealership accepts shipment of a full car carrier, as opposed to one only carrying one or two cars specially ordered by the dealership. The manufacturer may enter a conditional purchase opportunity into conditional purchase opportunity database 320, specifying the price, or discount in price, for a full car carrier. When a customer visits a dealership, or alternatively selects a dealership for delivery of a car ordered online, they may be presented with the option to buy now—wherein they will pay standard price—as well as the option to input a contingent purchase—wherein they receive a discount—stored in contingent purchase database 330. If the contingent purchase option is selected, it is associated with the conditional purchase opportunity. When the number of contingent purchases is equal to the number of cars in a full car carrier, all the contingent purchases are transacted. Until that point, the purchase was only contingent upon reaching the conditions of the conditional purchase opportunity.

In one embodiment, an interface may be provided to facilitate cooperative purchasing of health care policies. Health insurance providers generally provide better rates to larger pools of care recipients. A health insurance provider may input into conditional opportunity database 320 a number or recipients required to achieve a certain pricing structure. Small companies or individuals may then view the conditional purchase opportunity via a conditional purchase opportunity interface. These companies or individuals may then make a contingent purchase input into the contingent purchase database 330, indicating the number of contingently committed individuals. When the purchase threshold of required individuals is met, the contingent purchase of the health care policies is transacted. The purchase threshold in such a case may also include additional factors such as age, medical history, and the like. Any conditions may be applied associated with the conditional sale opportunity with regards to the contingent purchases.

Figure 5:
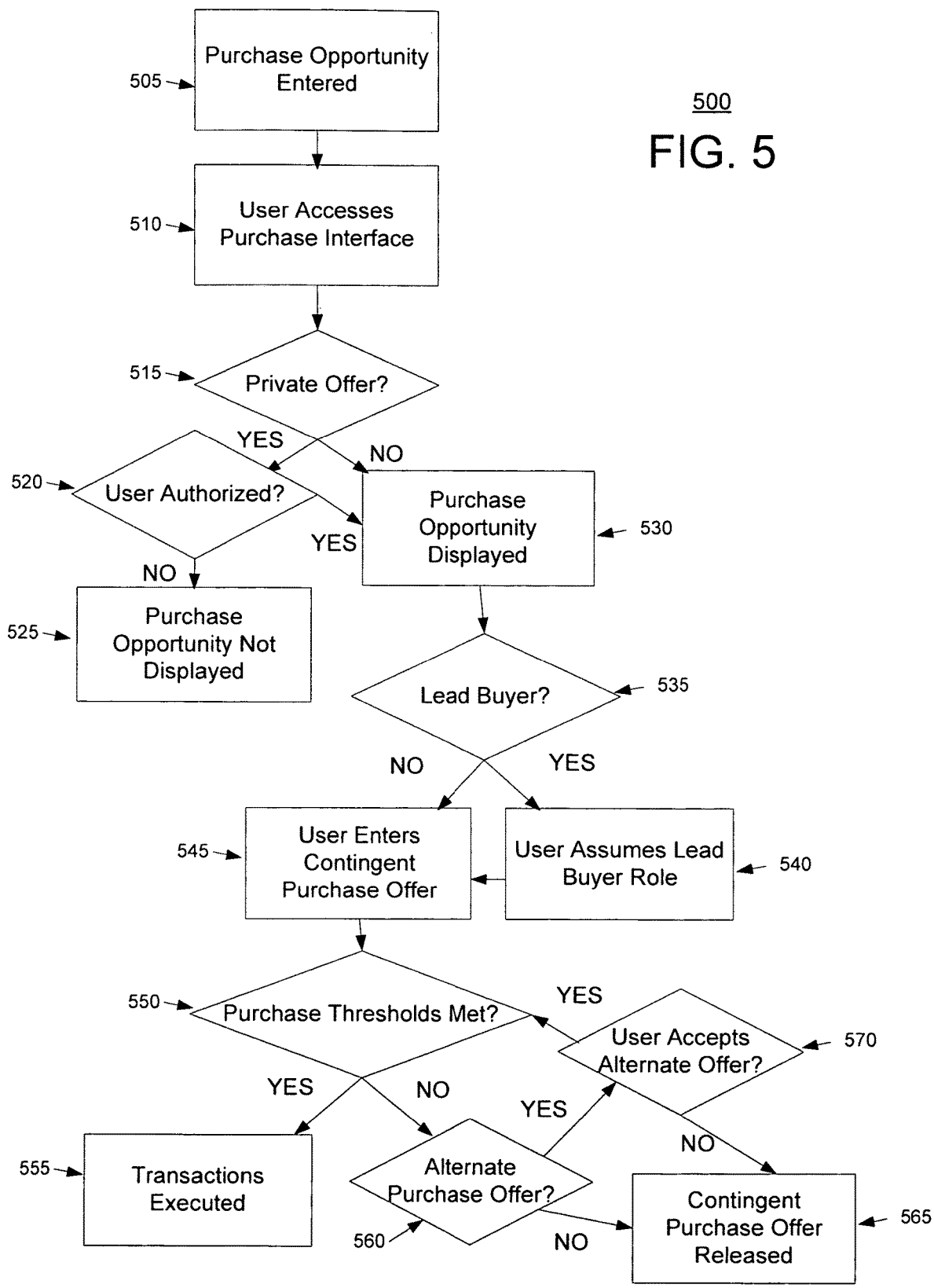
FIG. 5 illustrates a flowchart representative of one embodiment of a process for cooperative purchasing.

FIG. 5 illustrates a flowchart representative of one embodiment of a process for cooperative purchasing. First, a purchase opportunity is entered into the system (BLOCK 505). In one embodiment, for example, the purchase opportunity may be entered into conditional purchase opportunity database 320. A user of the cooperative purchase accesses the conditional purchase interface (BLOCK 510). In one embodiment, the conditional purchase interface is a conventional web site. In one embodiment, the web site may be a social networking site. In one embodiment, the user may log into the web site using login information from, and connecting to, a user profile stored in user database 340. In one embodiment, a conditional purchase offer may be designated for an individual or group of individuals, or restricted from an individual or group of individuals. Any conditional purchase with limited availability based on who accesses it is said to be a private offer. When a user accesses the cooperative purchase interface it is determined whether the purchase opportunity entered is a private offer or not (BLOCK 515). If it is a private offer, it is then determined if the user is authorized to view the private offer (BLOCK 520). For example, the cooperative purchase control server 310 may determine whether the user is authorized to view a purchase opportunity. If the user is unauthorized, the conditional purchase offer is not displayed (BLOCK 525). If the offer is not a private offer, or if the user is authorized to view the private offer, the conditional purchase opportunity is displayed to the user (BLOCK 530). In one embodiment, a conditional purchase offer may allow, or require, the designation of a lead buyer. For example, the car manufacturer in the above example requires a dealership to deliver the cars to. The dealership here acts as a lead buyer. In another example, a product may be shipped in bulk to an individual who is then responsible for the distribution of the product to the other buyers. In one embodiment, a lead buyer may indicate the receiver of the product or service indicated in the cooperative purchase opportunity. Alternatively, the lead buyer may be responsible for soliciting a certain number of purchases on a cooperative purchase opportunity. On the conditional purchase interface, the user may indicate whether they wish to assume the role of lead buyer (BLOCK 535). If the user selects to assume the role of lead buyer (BLOCK 540), this is recorded. In one embodiment, for example, this may be recorded in contingent purchase database 330. If the user selects not to be a lead buyer, the user may enter a contingent purchase offer (BLOCK 545). After the user selects to be the lead buyer, the user may enter a contingent purchase offer (BLOCK 545). The system checks whether purchase thresholds associated with the conditional purchase opportunity have been met (BLOCK 550). For example, when the contingent purchase offer is entered into the system, the cooperative purchase control server 310 may determine whether each purchase threshold required by the conditional purchase opportunity has been met. A purchase threshold may be made up of one or more conditions such as a threshold quantity of purchases requires, a number of purchasers that must purchase, a unit price at which a quantity must be purchased, a total price of goods or services that must be reached, or one or more sale time factors or user characteristic factors. A sale time factor may be an expiration date for the conditional purchase opportunity, or a date on which a service is available for rendering, or any other date pertinent to the sale or purchase of a product, service, an option to buy a product, or an option to buy a service. A user characteristic factor may be the age of a user, their purchase history, gender, medical history, number of relationships in one or more social network databases, or any other information that may be stored in relation to the user or requested of the user at the time of purchase. If the purchase thresholds have been met (BLOCK 550), the contingent purchases associated with the conditional purchase offer are transacted (BLOCK 555). In one embodiment, for example, a user has entered credit card information associated with the contingent purchase. In this embodiment, transacting the contingent purchase may include contacting credit processing gateway 350 to charge the amount specified in the contingent purchase. Alternatively, the user may have an escrow account associated with their user profile stored in user database 340. Here, the transaction may withdraw the amount specified in the contingent purchase from the escrow account. Other embodiments include withdrawing the money from bank accounts via bank server 360, or alternative payment system 370, which may include such systems as PayPal, iGMPay, or the like. If the purchase threshold has not been met, the system may stay in stasis. Alternatively, the seller may present an alternate purchase offer (BLOCK 560). For example, if a sale time factor such as an expiration date is reached, or the date on which a service or product is to be rendered is reached, the seller may choose to retract the conditional sale offer, or if the conditional purchase is made by another group of buyers, the seller may make an alternate conditional purchase offer. If no alternate conditional purchase offer is made, the contingent purchase offer is released (BLOCK 565). If the seller makes an alternate conditional purchase offer, the user may be presented with the opportunity to accept the alternate conditional purchase offer (BLOCK 570). In one embodiment, the user may automatically accept the alternate purchase offer. Alternatively, the user may provide input regarding their acceptance or denial of the alternate conditional offer. If the user chooses not to accept the alternate conditional offer, the contingent purchase is released (BLOCK 565). If the user accepts the alternate conditional offer, the cooperative purchase control system again checks if purchase conditions have been met (BLOCK 550), and progresses from there.

In one embodiment, the cooperative purchase control server may provide status updates with regards to conditional purchase offers, or related to specific contingent purchases. Status updates may be made available upon request at a web site interface, sent via email, made available in feed format, or any other means of communicating networked data as known in the art.

In one embodiment, the price of a cooperative purchase opportunity may vary based on the number of lead buyers, or number of shipments required to fulfill the transactions or delivery of the product or service. For example, a cooperative purchase opportunity may allow multiple users to specify themselves as lead buyers. All contingent prices may be increased the same amount based on the opportunity having more than one lead buyer. Alternatively, the prices for each lead buyer and associated with each lead buyer may be adjusted based upon the number of buyers associated with each lead buyer. For example, if one a first buyer was responsible for ten contingent purchases, and a second was responsible for two, the first buyer and the ten contingent purchases associated with him may receive a lower price than those associated with the second lead buyer.

In one embodiment, a seller reliability ranking may be maintained associated with entities offering conditional purchase opportunities. If a seller retracts an offer, fails to fulfill their part of a transaction, or behaves in some other way in detriment or in aid of those placing contingent purchase offers, their ranking may be adjusted accordingly. The seller reliability ranking may be associated with each conditional purchase opportunity associated with that seller, and may be made available to potential users. Users of the system may also provide feedback regarding sellers that may influence or solely comprise the seller reliability ranking.

Similarly, a buyer reliability ranking may be maintained associated with users of the conditional purchase system. If a buyer retracts an offer, fails to have funds available for an attempted transaction, or behaves in some other manner in detriment or aid to the conditional purchase system, their ranking may be adjusted accordingly.

A lead buyer reliability ranking may be maintained associated with users of the conditional purchase system. If a lead buyer retracts an offer, fails to have funds available for an attempted transaction, fails to deliver the purchased items in a timely manner, or behaves in some other manner in detriment or aid to the conditional purchase system, their ranking may be adjusted accordingly.

In one embodiment, a cooperative purchase system may work in conjunction with a social network database. In one embodiment, a conditional purchase offer may be presented to an individual or a target group within social network database, or a list of available conditional purchase offers may be presented to one or more users of the social network. Users of a social network may be provided with the ability to communicate offers between themselves, facilitated by relationships in the social network database. For example, an individual in the social network database may be presented with the opportunity to book a private room at a local bar, including a set price for food and drinks for a period of time on a certain date, if they can get 20 people to pay $25. The user may accept lead buyer status on this offer, and click a link or button to have the offer forwarded to users having a friend relationship with them in the social network database. When these users receive this offer, they may be presented with the opportunity to make a contingent purchase on it, and may be informed of who has assumed the lead buyer role. These users may in turn forward the offer to users having a friend relationship with them in social network database.

Alternative to forwarding the conditional purchase opportunity, users may select to post the opportunity on a page associated with their user profile. The user may use the message system to alert other users in their network of the presence of the conditional purchase opportunity on their profile page. In one embodiment, the user may select that only users they hold friend relationships with in the social network may see or respond to the conditional purchase opportunity. Alternatively, they may allow anyone to see the opportunity. In one embodiment, the user of a social network, or any lead buyer in fact, may selectively allow involvement in the conditional purchase opportunity. For example, they may not wish to allow a user that is geographically separated from them to participate in a purchase if they are responsible for delivery of the item.

In one embodiment, conditional purchase opportunities may be communicated over network 210 in feed format. In this manner, feed formatted content representing conditional purchase opportunities may be maintained at one node or on one server, but the opportunities may be presented on any node or server capable of consuming feed formatted content. For example, cooperative purchase control server 310 may be one instance of a service provider node 280, and may provide conditional purchase opportunities to one or more other nodes that may include social networking sites. A social networking site including feed formatted content consumption capabilities, for example RSS aggregation, may be ideally suited to present conditional purchase opportunities. The site may allow users to mark specific feed items that may then be published on their user profile.

Individuals or group of individuals may be targeted for conditional purchase offers based on such factors as feed subscription information, recommendations they have provided, relationships in social network database, user profile information, or a priority ranking. A priority ranking, may be, for example, the results of a race to accomplish a certain task or goal, fantasy sports results, contest or game results, purchasing history, site usage, buyer reliability ranking, lead buyer reliability ranking, survey results, or the like.

In one embodiment, a feed formatted content aggregation node, or independent access portal (IAP) may facilitate bulk purchasing. A feed may be supplied, delivering purchase opportunities to IAP users. For example, the IAP may secure the option to purchase one thousand copies of a DVD at a certain discount. The IAP may then offer the deal via a feed, placing a contingency on the offer that a certain number of users must accept the deal for anyone to get the deal. When a user receives the contingent deal offer they may be presented with several options. For example they may be provided with a link that delivers them to a page detailing the offer and allowing them to input their billing information. Alternatively, if the user has already supplied billing information to the IAP, they may be provided with a link or button that immediately confirms their contingent purchase. If a critical number of contingent purchase offers are accepted, all those who have accepted the contingent purchase are billed, the bulk purchase made, and the product distributed or service rendered.

Figure 6:
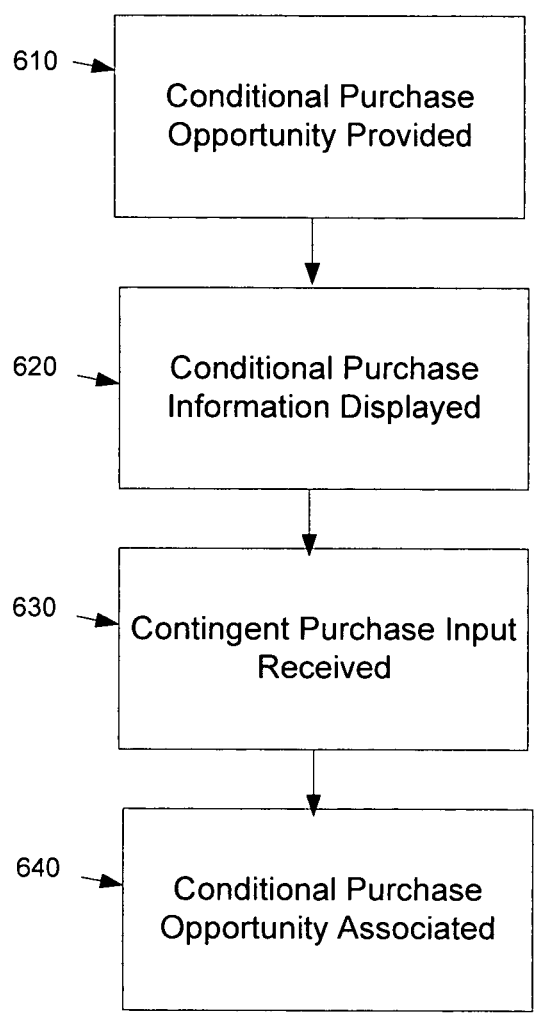
FIG. 6 illustrates a flowchart representative of one embodiment of a process for facilitating cooperative purchasing.

Contingent purchase information may be integrated with the social network database. For example, a page may display which of your friends in a social network have accepted a contingent purchase offer. FIG. 6 illustrates a flowchart representative of one embodiment of a process for facilitating cooperative purchasing at 600. At least one conditional purchase opportunity is provided including at least one purchase threshold (BLOCK 610). Information associated with the conditional purchase opportunity is provided at a display node (BLOCK 620). A display node may be, for example, one of the devices described in association with user node 220, such as a computer or a cell phone. A contingent purchase input is received from at least one user having a user profile on a social network (BLOCK 630). The conditional purchase opportunity is associated with the user profile (BLOCK 640). Contingent purchase input may include a purchase input, the quantity purchased, or the like. Contingent purchase input may also include the selection to act as a lead buyer on the conditional purchase opportunity.

Figure 7:
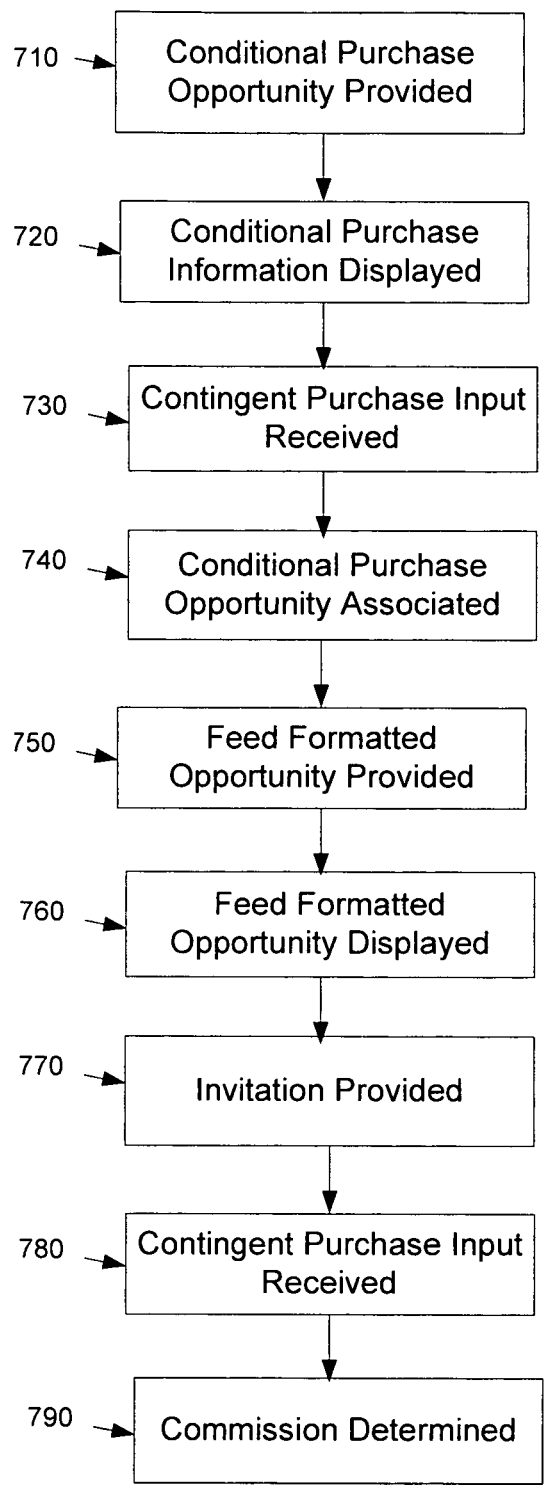
FIG. 7 illustrates a flowchart representative of one embodiment of a process for facilitating cooperative purchasing.

FIG. 7 illustrates a flowchart representative of one embodiment of a process for facilitating cooperative purchasing at 700. At least one conditional purchase opportunity is provided including at least one purchase threshold (BLOCK 710). Information associated with the conditional purchase opportunity is provided at a display node (BLOCK 720). A contingent purchase input is received from at least one user having a user profile on a social network (BLOCK 730). The conditional purchase opportunity is associated with the user profile (BLOCK 740). The conditional purchase opportunity is provided as feed formatted content (BLOCK 750). The feed formatted content is displayed on a social network interface associated with the user profile (BLOCK 760). A social network interface may be displayed on a computer, cell phone, PDA or the like, and may be a software application resident on the device, web-based, or a combination of both. A conditional purchase opportunity invitation is provided to a least second user based on at least one relationship in the social network (BLOCK 770). The invitation or opportunity may be provided based on recommendation input from the user, for example the user may check a box or click a button indicating to recommend the opportunity to the users they have as friends in the social network. The user may select specific friends when providing recommendation input. Alternatively, the invitation may be sent to all of a user's friends based on the user providing contingent purchase input without requiring recommendation input. The invitation may be provided via email, instant messenger, indexed to a feed associated with the second user, or the like.

A second contingent purchase input is received based on the association between the user and the first contingent purchase input (BLOCK 780). A user commission is determined based on the association and the contingent purchase inputs (BLOCK 790).

Figure 8:
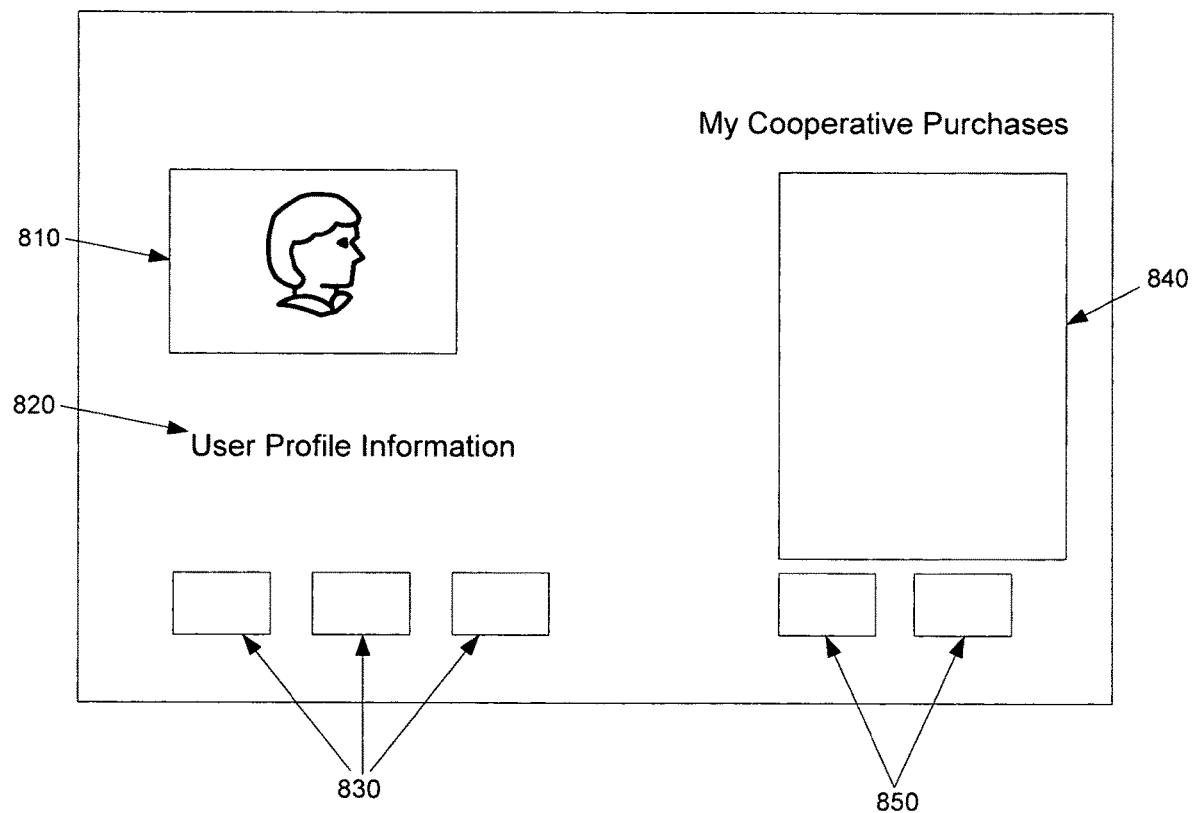
FIG. 8 illustrates a schematic diagram of one embodiment of a social network interface.

FIG. 8 illustrates a schematic diagram of one embodiment of a social network interface at 800. A social network profile interface, for example a web page, may include a photograph of the user 810, user profile information 820, and a list, for example a list of hyperlinked photographs, of the user's friends 830. In one embodiment, a display of cooperative purchases 840 associated with the user is included on the page. The display may have option buttons, links, or similar interface inputs 850 that allow one viewing the page to select the type of cooperative purchase opportunities they wish to view. For example they may select to view the opportunities in which the user has participated, or a list of opportunities for which the user is acting as lead buyer, or some other filtered view of opportunities. The display of cooperative purchases 840 may be text-based, may include images of the product or service referenced, or may include some other multimedia content such as audio or video. The display may include a progress indicator. The progress indicator may be text-based or may be a chart or graph. The progress indicator may display the progress to a purchase threshold associated with a cooperative purchase opportunity. For example, a progress indicator may provide a display summing the contingent purchase inputs. Alternatively it may display the number of inputs still required to reach the threshold. Time left on the deal may also be displayed. In one embodiment, a list of users participating in a cooperative purchase opportunity may be provided and may be displayed. The list may be filtered based on relationships in the social network. For example, the display of cooperative purchases 840 may include a list of friends who are also participating in the cooperative purchases.

Figure 9:
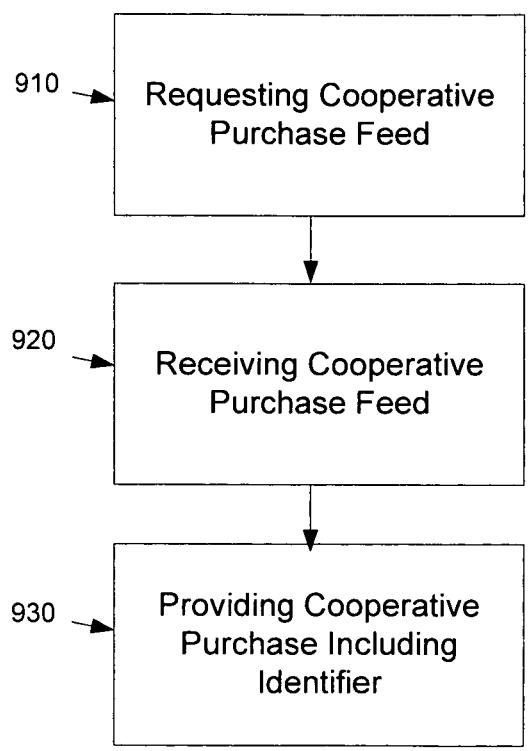
FIG. 9 illustrates a flowchart representative of one embodiment of a process for facilitating cooperative purchasing.

FIG. 9 illustrates a flowchart representative of one embodiment of a process for facilitating cooperative purchasing at 900. Cooperative purchase feed formatted content associated with at least one social network user account is requested (BLOCK 910). Cooperative purchase feed formatted content including at least one cooperative purchase opportunity is received in response to the request (BLOCK 920). The cooperative purchase offer is provided including a social network identifier, at a social network interface (BLOCK 930). A social network identifier is used by the cooperative purchase system to identify the origin of a purchase. When cooperative purchase feed formatted content is requested, the cooperative purchase control server 310 may identify the source of the request and provide the content including the social network identifier. Alternatively, the social network may convert the received feed to include the social network identifier. Requests to purchase made based on the provided offer will include the social network identifier, and may therefore be tracked at the cooperative purchase control server 310. In one embodiment, a user account may be associated with a particular social network, and the social network identifier may be an identifier for the user account based on this association.

Figure 10:
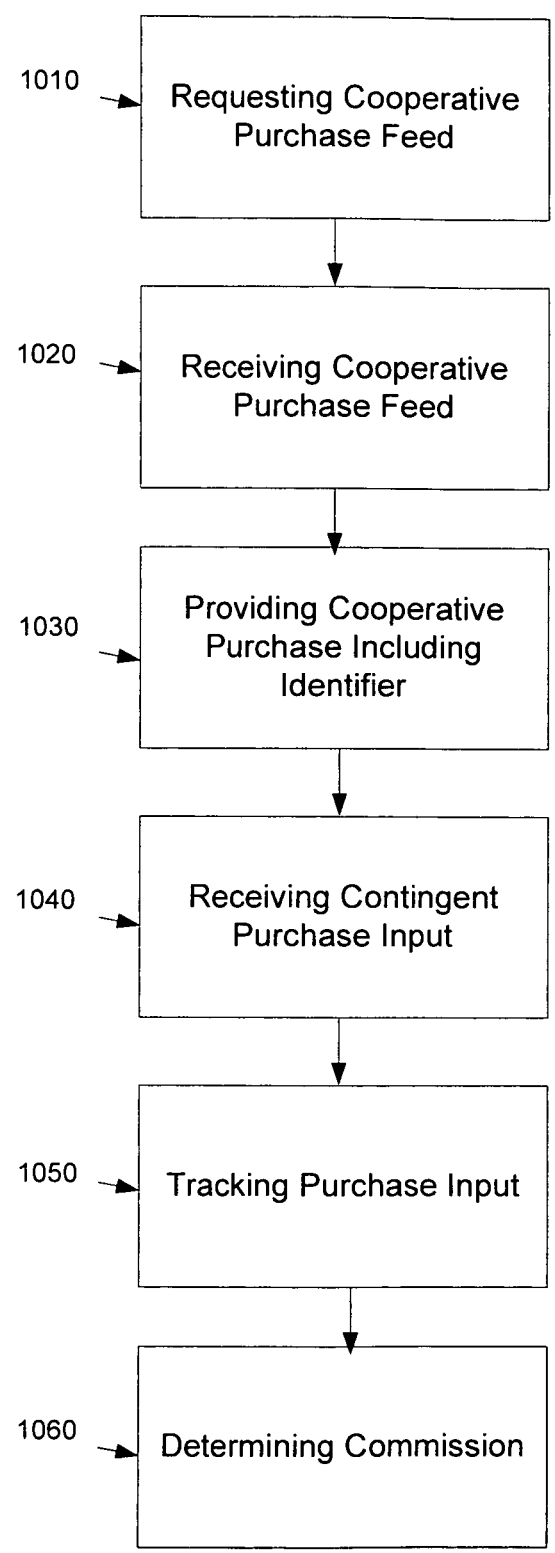
FIG. 10 illustrates a flowchart representative of one embodiment of a process for facilitating cooperative purchasing.

FIG. 10 illustrates a flowchart representative of one embodiment of a process for facilitating cooperative purchasing at 1000. Cooperative purchase feed formatted content associated with at least one social network user account is requested (BLOCK 1010). Cooperative purchase feed formatted content including at least one cooperative purchase opportunity is received in response to the request (BLOCK 1020). The cooperative purchase offer is provided including a social network identifier, at a social network interface (BLOCK 1030). A purchase input including the social network identifier is received from a user at a cooperative purchase server (BLOCK 1040). The purchase input is tracked based on the social network identifier at the cooperative purchase server (BLOCK 1050). Commission is determined based on the tracked purchase inputs (BLOCK 1060). In one embodiment, purchase inputs and/or commissions may be tracked over multiple social networks as shown in FIG. 3.

Figure 11:
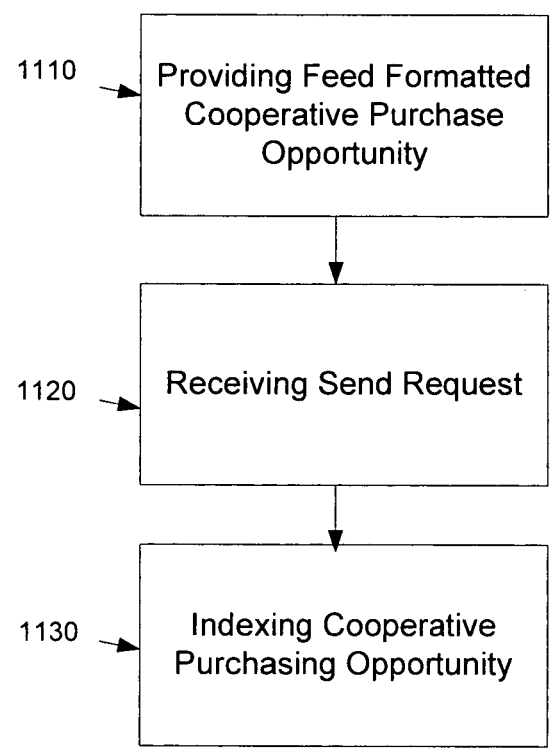
FIG. 11 illustrates a flowchart representative of one embodiment of a process for operating a cooperative purchasing service.

FIG. 11 illustrates a flowchart representative of one embodiment of a process for operating a cooperative purchasing service at 1100. At least one feed formatted cooperative purchasing opportunity is provided to a user (BLOCK 1110). A request to send the cooperative purchase opportunity to an associate is received from the user (BLOCK 1120). The cooperative purchase opportunity is indexed to an associate feed based on the request (BLOCK 1130). An associate feed is a feed associated with the associate, for example an alerts or message feed of an IAP.

Figure 12:
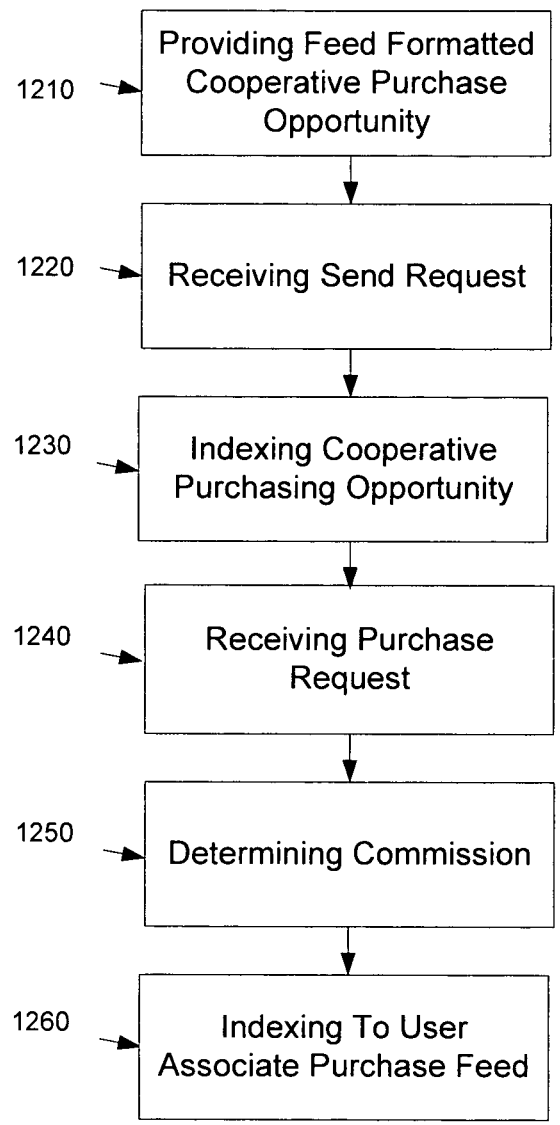
FIG. 12 illustrates a flowchart representative of one embodiment of a process for operating a cooperative purchasing service.

FIG. 12 illustrates a flowchart representative of one embodiment of a process for operating a cooperative purchasing service at 1200. At least one feed formatted cooperative purchase opportunity is provided to a user (BLOCK 1210). A request to send the cooperative purchase opportunity to an associate is received from the user (BLOCK 1220). The cooperative purchase opportunity is indexed to an associate feed associated with the associate based on the request (BLOCK 1230). A request is received to purchase is received from the associate (BLOCK 1240). A commission is determined based on the cooperative purchase opportunity relationship (BLOCK 1250). The associate is indexed to a user associate purchase feed based on the request to purchase (BLOCK 1270). A user associate purchase feed is a feed indicating what associates are participating in the same cooperative purchase opportunities as a user. In one embodiment, the user associate purchase feed may indicate only the associates who found the opportunity through the user's profile.

For example, a user of a social network may wish to purchase a laptop. The user may search a cooperative purchase interface for deals pertaining to laptops. The user may select to participate in a cooperative purchase opportunity that requires a lead buyer to collect five purchases to achieve a certain price. The user may elect to participate in the deal and take the lead buyer role. On assumption of this role, the cooperative purchase interface may provide the opportunity for the user to list their participation in the opportunity on one or more social networks. For example, the user may be presented with form elements to provide username and/or password details for Friendster or MySpace. Alternatively, the user may be presented with a feed URL that lists the cooperative purchase opportunities they are participating in, or are lead buyers on. The user may enter this feed URL into a designated form element on a social network interface. Alternatively, the social network interface may provide the user with the opportunity to provide username and/or password to the cooperative purchase system. Through one of these processes, the social network may be provided with a feed of cooperative purchase opportunities associated with the user. When the user elects to participate in the laptop opportunity and provides their feed to a social network, the social network may alert their associates of the user's participating in the laptop opportunity. Associates may participate in the opportunity and move the user toward the five required purchases. In one embodiment, the opportunity may be displayed on the user profile. Alternatively the opportunity may be displayed on the associate's page, in a message inbox of the associate, or on some related associate interface. In one embodiment, the user must elect to forward the opportunity to their associates.

In one embodiment, a user can receive a contingent deal proposal, and claim lead for the deal which may automatically send alerts to his immediate friend circle within a social network, any of these friends may then take sub-lead position for their friend circle, and so on. Alerts sent out by the sub-lead position may exclude those also in the initial lead friend circle. The friends of the leader and sub-leaders may, in this manner, be alerted of the opportunity by a first-degree friend. The passing of money from accounts may also be done through friends, or directly with the seller.

In one embodiment, a deal proposal can include a contingent deal date, which may be provided as a date marker in feed format and uploaded into a user feed based calendar. A feed based calendar is software based calendar that displays items on the calendar based on date markers within feed formatted content. In one embodiment the user may have a calendar dedicated to contingent deals, or a calendar that displays contingent deals along with other calendar items. A user can send an alert to a circle of friends and the feed formatted deal may be loaded into their calendars. Information provided in the calendar may include, for example, units needed to complete contingent deal and price per unit.

In one embodiment, the feed based calendar may allow a user to view an available cash balance and/or projected cash balance coordinated with the calendar. The user may then readily determine if there is a current or predicted balance available to afford the contingent deals. For example, the calendar may display anticipated balances based on scheduled payments, paychecks, and the like. The user may, in one embodiment, have the ability to back out of certain deals before money is withdrawn from his account.

In one embodiment, the product or service provider interface may allow the provider to directly send out alerts to users who have achieved a certain purchasing status. This will encourage a purchaser to achieve and maintain the status and provide the service provider with a regular group of customers. In one embodiment the alerts may be feed formatted and read into other sites or a feed calendar. The purchaser status may be of various levels and may, for example, allow the user who has achieved a certain status to include friends in on the deal. Purchasing status may be based on the number of cooperative purchases executed by a user, the total value associated with a user's cooperative purchases, one or more reliability rankings, the number of times a user has acted as lead buyer, the total value of purchases associated with the user wherein they acted as lead buyer, or the like.

In one embodiment, the cooperative purchase system may track a user's participation. Successfully transacted purchases may be recorded, along with whether the user maintained the lead buyer role or not. The system may in this manner determine how effective a user is in leading or aiding in successful conditional purchasing. In one embodiment, users may be singled out to receive special offersbased on this effectiveness or some other factor. Users may, in one embodiment, be offered a commission for successful transaction of a purchase in which they maintain the lead buyer role.

In one embodiment, a user may specify items for a watch list on the conditional purchase interface and receive status updates on this offer. Users may also add conditions to contingent purchases such as dates by which or after which they require the transaction to take place, account balances they must have in escrow when the transaction is to take place, and the like. The cooperative purchase control server 310 may take these additional contingencies into account when calculating the current status of an offer. The contingent purchase interface may also display various statuses of conditional purchases the user has made. For example, a user may have $300 in escrow and one hundred contingent purchases pending that all are individually below $300. If a contingent purchase is transacted for $50, all pending contingent purchases over $250 may be set to a status indicating insufficient funds, displayed as such to that user, and their contribution to the purchase threshold for those offers temporarily or permanently removed.

In one embodiment, status updates may include alerting users when friends get into or out of a contingent purchase offer. In one embodiment, contingent purchase offers may be displayed in a feed based calendar. For example, a sale time factor may be included in a feed as a date marker, and the item available for conditional purchase may be included in the feed as a feed item title. In one embodiment, a period of time may be provided after a conditional purchase has reached its purchase threshold wherein users may still participate in the offer. In this embodiment, the date by which the user must join in to get the deal may be highlighted or the sale displayed in some manner on their calendar.

In one embodiment, the cooperative purchase control server 310 may provide sellers with information regarding the users who accept or deny their offers. In one embodiment, the seller may be provided with interface functions to either collect contact information for these users, or functions to contact the users directly.

In one embodiment, a user may act in the role of seller, even without product or service in hand. For example, a group of people may be interested in purchasing season tickets for the Chicago Cubs, but only provided sufficient commitments to cover a certain portion of the of the package, for example, 85 of the tickets. A user may enter the opportunity to purchase the season tickets into the conditional purchase database 320, including a sale time factor indicating an expiration date, which is the date they expect the tickets not to be available anymore. The conditional purchase may also include a price per ticket, and the threshold quantity of 85. The user may specify that this is a public offer, or they may mark the offer as private and distribute invitations or a password to view the offer to a select group of people. When 85 of the tickets have been contingently purchased at the set price, they are all transacted. In one embodiment, the money may be transferred into an escrow account held on cooperative purchase control server 310 for the user who set up the sale. The money may also be transferred directly to their bank account, or the like. In one embodiment, if the tickets are not available, the user may select to undo the transaction, this automatically undoing all the individual contingent transactions.

In one embodiment, the cooperative purchase system may be employed to buy an individual item, or a few items, for a large group. For example, a church may input a conditional purchase opportunity wherein people have the opportunity to pay a portion of a church re-flooring project. Donors may enter contingent donations until the threshold price is met to have the job done, at which point all donations would be transacted.

A cooperative purchase system may earn money for a variety of services. For example, the system may take a percentage of each transacted deal. The system may charge sellers for listing conditional purchase opportunities. Certain features of the interface, or certain threshold or buying options may not be made available to sellers and users unless they pay for a premium account. Sellers may pay for marketing information about the users of the system, or for the opportunity to directly target users of the system.

In one embodiment, vendors or sellers associated with cooperative purchase opportunities may be provided with a variety of interface options. For example, the system may communicate a transacted purchase of ten pizzas to a local restaurant via fax. The fax may include the name of the purchasers, the name of the lead purchaser, one or more confirmation numbers, a credit card or other account number, or the like in order to verify the identity of the purchaser. Similar communication may be provided by a cellular phone interface, email, or a network connection to an existing or provided sales register or display unit. For example, a display unit may be provided including a wired, cellular or other wireless data connection. When a cooperative purchase for a particular vendor is transacted, their display unit may be contacted, and a local cache of information updated, a signal provided, or some other behavior preparing the vendor to satisfy or notifying the vendor of the transaction. In one embodiment, the interface includes a search function to locate transacted purchases by some identification source such as name, confirmation number, or the like.

In one embodiment, a cooperative purchase system may act as an advertising network, or in conjunction with an advertising network. Available cooperative purchase opportunities may be displayed as advertisements on web pages, cell phones, or the like. In one embodiment, a site or service administrator may select the cooperative purchase opportunities they wish to display to their users. Alternatively, the advertising network may select a cooperative purchase opportunity based on keyword, subject, or context of the page on which the cooperative purchase opportunity ad will be displayed. In one embodiment, the cooperative purchase opportunity displayed may be based upon a cookie or some other user identifier.

The present invention may be embodied in other specific forms without departing from its spirit or essential characteristics. The described embodiments are to be considered in all respects only as illustrative and not restrictive.

We claim:

1. A method for facilitating cooperative bulk discount purchasing of a product or service by a group of buyers, the method comprising:
    selecting buyers to view private offers from the group of buyers on a social network;
    providing a conditional purchase opportunity from a cooperative purchase control server of a cooperative purchasing service for cooperative bulk discount purchasing by at least two of the buyers, the conditional purchase opportunity including a purchase threshold and an individual purchaser qualification factor, the conditional purchase opportunity being a private offer;

providing cooperative purchase feed formatted content associated with the conditional purchase opportunity via a telecommunication network from the cooperative purchase control server exclusively to at least one display node of the selected buyers, the cooperative purchase feed formatted content being structured data having a social network identifier identifying a social network origin of the conditional purchase opportunity;

receiving a first contingent purchase input including the social network identifier at the cooperative purchase control server from a first user of the selected buyers having a user profile on the social network, the social network comprising relationships between user accounts stored on a social network server, the relationships between user accounts being established in response to a request from a first user account to connect to a second user account, and the social network being separate and distinct from the cooperative purchasing service;

providing a publication option to publish the cooperative purchase feed formatted content from the cooperative purchase control server to the user profile on the social network;

receiving a second contingent purchase input including the social network identifier at the cooperative purchase control server from a second user of the selected buyers, the second contingent purchase input being received subsequent to the first contingent purchase input;

initiating at the cooperative purchase control server a first transaction based on the first contingent purchase input and a second transaction based on the second contingent purchase input when the purchase threshold is met, the first user satisfies the individual purchaser qualification factor, and the second user satisfies the individual purchaser qualification factor;

delivering the product or service in response to the initiating;

publishing the cooperative purchase feed formatted content from the cooperative purchase control server to the user profile on the social network; and associating the cooperative purchase feed formatted content with the user profile on the social network.

2. The method of claim 1, further comprising:
displaying the cooperative purchase feed formatted content on a social network interface associated with the user profile.

3. The method of claim 2, wherein the displaying includes providing a progress indicator based on the contingent purchase inputs.

4. The method of claim 2, wherein the cooperative purchase feed formatted content is displayed based on the relationships in the social network.

5. The method of claim 2, wherein the cooperative purchase feed formatted content is displayed based on a lead buyer designation.

6. The method of claim 1, further comprising:
providing via the social network server a conditional purchase opportunity invitation to the second user based on the relationships between user accounts in the social network, wherein the second user has a second user profile on the social network.

7. The method of claim 6, wherein the conditional purchase opportunity invitation is provided to the second user based on a recommendation input from the first user.

8. The method of claim 1 further comprising:
providing via the social network server the conditional purchase opportunity to the second user in the social network responsive to the receiving of the first contingent purchase input, wherein the second user has a second user profile on the social network.

9. The method of claim 1, further comprising:
determining a user commission to the first user based on an association between the first user and the second user, and the second contingent purchase input.

10. A method for facilitating cooperative bulk discount purchasing of a product or service by a group of buyers through a cooperative purchasing service, the method comprising:

selecting buyers to view private offers from the group of buyers on a social network;

requesting, from a cooperative purchase control server, cooperative purchase feed formatted content associated with a social network user account, the cooperative purchase feed formatted content having conditional purchase opportunities including a purchase threshold and an individual purchaser qualification factor, the conditional purchase opportunity being a private offer, the cooperative purchase feed formatted content being structured data having a social network identifier identifying the social network user account, the social network comprising relationships between user accounts stored on a social network server, the relationships between user accounts being established in response to a request from a first user account to connect to a second user account, and the social network being separate and distinct from the cooperative purchasing service;

receiving, at the social network server, the cooperative purchase feed formatted content including a cooperative purchase offer for cooperative bulk discount purchasing by at least two buyers of the selected buyers in response to the request; and providing the cooperative purchase offer including the social network identifier, at a social network interface associated with the social network server.

11. The method of claim 10 further comprising:
receiving a contingent purchase input associated with the cooperative purchase offer including the social network identifier from a user.

12. The method of claim 11 further comprising:
tracking the contingent purchase input based on the social network identifier.

13. The method of claim 12 further comprising:
determining commission based on the tracked contingent purchase input and the social network identifier.

14. The method of claim 10 wherein cooperative purchase feed formatted content including the cooperative purchase offer is received at a plurality of separate and distinct social network services, and wherein each of the social network services provides the cooperative purchase offer including a distinct social network identifier.

15. The method of claim 14 wherein contingent purchase input is tracked based on the social network identifiers.

16. The method of claim 15 further comprising:
determining commission based on the tracked contingent purchase input and the social network identifiers.

17. A method for operating a cooperative purchasing service for facilitating cooperative bulk discount purchasing by a group of buyers, the method comprising:

selecting buyers to view private offers from the group of buyers on a social network;

providing a feed formatted cooperative purchasing opportunity for cooperative bulk discount purchasing by at least two buyers to a first user of the selected buyers of the social network, the feed formatted cooperative purchasing opportunity having a conditional purchase opportunity including a purchase threshold and an individual purchaser qualification factor, the conditional purchase opportunity being a private offer, the feed formatted cooperative purchasing opportunity being structured data having a social network identifier identifying a social network origin of the conditional purchase opportunity, the social network comprising relationships between user accounts stored on a social network server, the relationships between user accounts being established in response to a request from a first user account to connect to a second user account, and the social network being separate and distinct from the cooperative purchasing service;

receiving at the social network server a request from the first user to associate the feed formatted cooperative purchasing opportunity with at last a second user of the selected buyers of the social network, the second user being an associate of the first user;

indexing at the social network server the feed formatted cooperative purchasing opportunity to an associate feed of the second user based on the request;

receiving a request to purchase from the second user; and sending a contingent purchase input including the social network identifier based on the request to purchase.

18. The method of claim 17, further comprising determining a commission to the first user based on the request to purchase.

19. The method of claim 17, further comprising indexing the second user to a user associate purchase feed based on the request to purchase.

20. The method of claim 1, further comprising:
receiving a plurality of additional contingent purchase inputs associated with the conditional purchase opportunity; and
transacting at least some of the plurality of additional contingent purchase inputs.

21. The method of claim 1 wherein the purchase threshold comprises a quantity of purchases required.

22. The method of claim 1 wherein the purchase threshold comprises a number of purchasers that must purchase.

23. The method of claim 1 wherein the purchase threshold comprises an expiration date.

24. The method of claim 1 wherein the purchase threshold comprises a total price of goods or services that must be reached.

25. A method for facilitating cooperative bulk discount purchasing of a product or service by a group of buyers, the method comprising:
selecting buyers to view private offers from the group of buyers on a social network;
providing a feed formatted conditional purchase opportunity from a cooperative purchase control server, the feed formatted conditional purchase opportunity comprising a quantity of purchases required, an expiration date, a purchase threshold, and an individual purchaser qualification factor, the feed formatted conditional purchase opportunity being a private offer, the feed formatted conditional purchase opportunity being structured data having a social network identifier identifying a social network origin of the feed formatted conditional purchase opportunity;

receiving at the cooperative purchase control server a first contingent purchase input associated with the feed formatted conditional purchase opportunity from a first user of the selected buyers, the first user having a first user profile on the social network, the social network comprising relationships between user accounts stored on a social network server, the relationships between user accounts being established in response to a request from a first user account to connect to a second user account, and the social network being separate and distinct from the cooperative purchasing service;

associating the feed formatted conditional purchase opportunity with the first user profile on the social network based on a publication of information associated with the conditional purchase opportunity from the cooperative purchase control server to the social network server;

receiving a second contingent purchase input associated with the feed formatted conditional purchase opportunity from a second user of the selected buyers, the second user having a second user profile on the social network, and the second contingent purchase input being associated with the first user;

initiating at the cooperative purchase control server a plurality of contingent purchase transactions associated with the feed formatted conditional purchase opportunity including a purchase based on the first contingent purchase input and a purchase based on the second contingent purchase input, the initiating being based on meeting the quantity of purchases required, meeting the individual purchaser qualification factor for the first user, and meeting the individual purchaser qualification factor for the second user;

delivering the product or service in response to the initiating; and determining a commission for the first user based on the second contingent purchase input using the social network identifier.

26. The method of claim 25 wherein the second contingent purchase input is associated with the first user based on the social network identifier.

27. The method of claim 26 wherein the social network identifier is provided by the cooperative purchase control server.

28. The method of claim 26 wherein the social network identifier is provided by the social network.

29. The method of claim 25 wherein the mans for associating the conditional purchase opportunity does not require recommendation input.

30. The method of claim 1 wherein publishing comprises execution, by the cooperative purchase control server, of at least one web services request against an API maintained by the social network service.

31. A system for facilitating cooperative bulk discount purchasing of a product or service by a group of social network users including a first user and a second user, the system comprising:
a cooperative purchase control server; and
a social network server operably connected to the cooperative purchase control server over a telecommunication network, the social network server being separate and distinct from the cooperative purchase control server;
the cooperative purchase control server being operable to:
provide a conditional purchase opportunity for cooperative bulk discount purchasing by the social network users, the conditional purchase opportunity including a purchase threshold and an individual purchaser qualification factor, the conditional purchase opportunity being a private offer;

provide cooperative purchase feed formatted content associated with the conditional purchase opportunity exclusively to at least one display node of the social network users selected to view private offers, the cooperative purchase feed formatted content being structured data having a social network identifier identifying a social network origin of the conditional purchase opportunity;

receive a first contingent purchase input including the social network identifier from the first user of the selected social network users;

receive a second contingent purchase input including the social network identifier from the second user of the selected social network users, the second contingent purchase input being subsequent to the received first contingent purchase input;

when the purchase threshold is met, the individual purchaser qualification factor is satisfied for the first user, and the individual purchaser qualification factor is satisfied for the second user, initiate a first transaction based on the first contingent purchase input and a second transaction in response to the second contingent purchase input and deliver the product or service to the first user and the second user;

publish the cooperative purchase feed formatted content to a first user profile on a social network in response to a publication option;

associate the cooperative purchase feed formatted content with the first user profile on the social network; and the social network server being operable to:

select the social network users to view private offers from the group of social network users on the social network;

store user accounts including the first user profile for the first user from the group of social network users;

manage the social network of relationships between the user accounts;

receive a request from a first user account to connect to a second user account to establish a relationship between the first user account and the second user account; and provide the publication option to publish the cooperative purchase feed formatted content to the first user profile.

* * * * *